United States Patent
Mitchell

(10) Patent No.: US 9,266,479 B2
(45) Date of Patent: Feb. 23, 2016

(54) CLIP DEVICE

(71) Applicant: Nathaniel Mitchell, Denver, CO (US)

(72) Inventor: Nathaniel Mitchell, Denver, CO (US)

(*) Notice: Subject to any disclaimer, the term of this patent is extended or adjusted under 35 U.S.C. 154(b) by 0 days.

(21) Appl. No.: 14/477,399

(22) Filed: Sep. 4, 2014

(65) Prior Publication Data

US 2015/0069197 A1     Mar. 12, 2015

Related U.S. Application Data

(60) Provisional application No. 61/876,868, filed on Sep. 12, 2013.

(51) Int. Cl.
| | |
|---|---|
| *A47B 96/00* | (2006.01) |
| *B60R 11/00* | (2006.01) |
| *F16B 2/22* | (2006.01) |

(52) U.S. Cl.
CPC . *B60R 11/00* (2013.01); *F16B 2/22* (2013.01); *B60R 2011/0008* (2013.01); *B60R 2011/0059* (2013.01); *B60R 2011/0071* (2013.01); *Y10T 29/49826* (2015.01)

(58) Field of Classification Search
CPC ....... F16M 13/022; F16M 13/02; F16M 2/22; B60R 11/00; B60R 2011/008; Y10T 29/49826
See application file for complete search history.

(56) References Cited

U.S. PATENT DOCUMENTS

| | | | |
|---|---|---|---|
| 5,836,055 A | 11/1998 | Cooper | |
| 6,123,906 A | 9/2000 | Farmer | |
| 6,138,688 A | 10/2000 | Lombardi, Jr. | |
| 6,283,658 B1 | 9/2001 | Estevez et al. | |
| 6,321,958 B1 | 11/2001 | Edrmann | |
| D546,432 S * | 7/2007 | Hundertmark | D23/366 |
| 7,458,471 B2 * | 12/2008 | Crudgington, Jr. | 211/41.9 |
| D594,954 S * | 6/2009 | Wheatley | D23/366 |
| 8,460,609 B1 * | 6/2013 | Wheatley et al. | 422/123 |
| 8,777,170 B2 * | 7/2014 | Gilbert et al. | 248/229.16 |

FOREIGN PATENT DOCUMENTS

WO     98/36655     8/1998

* cited by examiner

*Primary Examiner* — Amy Sterling
(74) *Attorney, Agent, or Firm* — Trenner Law Firm, LLC; Mark D. Trenner

(57) ABSTRACT

A clip device to secure a container to a mounting location. In an example, the clip device has a base having a first and second side. The clip device also has an arm connected to the first side of the base. The clip device also has an attachment connected to the arm, the attachment configured to removably receive the container. The clip device also has a plurality of legs connected to the second side of the base, the legs configured for securement to the mounting location.

15 Claims, 8 Drawing Sheets

CLIP DEVICE

PRIORITY CLAIM

This application claims the benefit of U.S. Provisional Patent Application No. 61/876,868 titled "Vent Clip" of Nathaniel Mitchell, filed on Sep. 12, 2013, hereby incorporated by reference as though fully set forth herein.

BACKGROUND

Lip balm is a popular item used to sooth and prevent chapped lips. Lip balm may be applied before or after being outside. A lip balm applicator commonly is cylindrical or tubular in shape and is generally small, being less than about two inches long and less than about a half inch in diameter, and therefore easily falls to the bottom of a storage compartment in a vehicle, making it hard to retrieve when needed.

DETAILED DESCRIPTION

Figure 1:
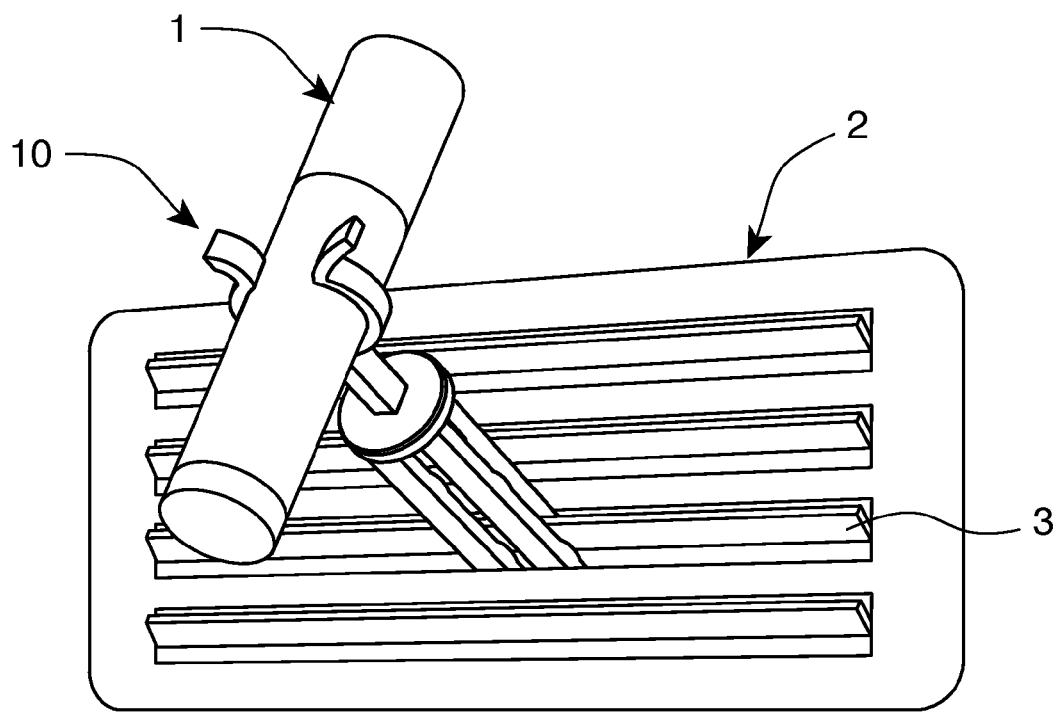
FIGS. 1-2 show a perspective view of an example clip device.

A clip device is disclosed herein as it may be implemented to retain a lip balm and/or other container. In an example, the clip device has elongate legs attached to a base with and an attachment configured to receive the container. In an example, the attachment may be flanged at the distal free ends to facilitate receiving the container. In an example, the elongate legs may be formed with ridges to assist in securing the clip device to the vehicle vent slats.

An example clip device may be provided to secure a container to a mounting location. The example clip device may have a base having a first and second side. The example clip device may have an arm connected to the first side of the base. The example clip device may have an attachment connected to the arm, the attachment configured to removably receive the container. The example clip device may have a plurality of legs connected to the second side of the base, the legs configured for securement to the mounting location.

In an example, the example clip device may have flanges on each of the plurality of legs. The example clip device may have a plurality of spaced-apart ridges on each of the plurality of legs, the ridges configured to removably grasp the mounting location. The attachment may be a semi-circular, open-ended clip, and may have flanges on each open end of the open-ended clip.

In an example, the example the diameter of the attachment expands to receive and secure the container, and the diameter returns to an initial size after removing the container. In an example, the attachment is configured to receive the container in an insertion direction perpendicular to an elongate axis of the plurality of legs and in an insertion direction parallel to the elongate axis of the plurality of legs.

An example method for clipping a lip balm applicator to a slatted vent is also disclosed. The example method includes securing the lip balm applicator into a semi-circular clip attached to a base having a plurality of legs, and fitting the plurality of legs into the slatted vent.

In an example, the method may also include expanding the plurality of legs within the slatted vent. The method may also include compressing the plurality of legs during fitting, and then automatically expanding the plurality of legs within the slatted vent. The method may also include expanding the diameter of the semi-circular clip to receive and secure the lip balm applicator; and returning the diameter of the semi-circular clip to an initial size after removing the lip balm container from the semi-circular clip.

Although not limited in practice, the clip device may be a vent clip configured to be secured to the air vent on the interior of a vehicle, such as but not limited to the heating and/or air conditioning vent on the vehicle dashboard or elsewhere in the vehicle. Positioning the clip device on the vehicle vent provides a convenience access location for the user for a container, such as but not limited to a lip balm container or applicator. That is, the driver and/or passenger can easily find the lip balm without having to dig through the glove compartment or other compartment (or on the floor) of the vehicle. In addition, heated air from the vehicle vent helps maintain the lip balm at a warm temperature, thus making it easier for the user to apply, even during cold weather. Likewise, cooled air from the vehicle vent helps maintain the lip balm at a cool temperature, thus helping prevent melting of the balm, even during hot weather.

Before continuing, it is noted that as used herein, the terms "includes" and "including" mean, but is not limited to, "includes" or "including" and "includes at least" or "including at least." The term "based on" means "based on" and "based at least in part on."

Figure 2:
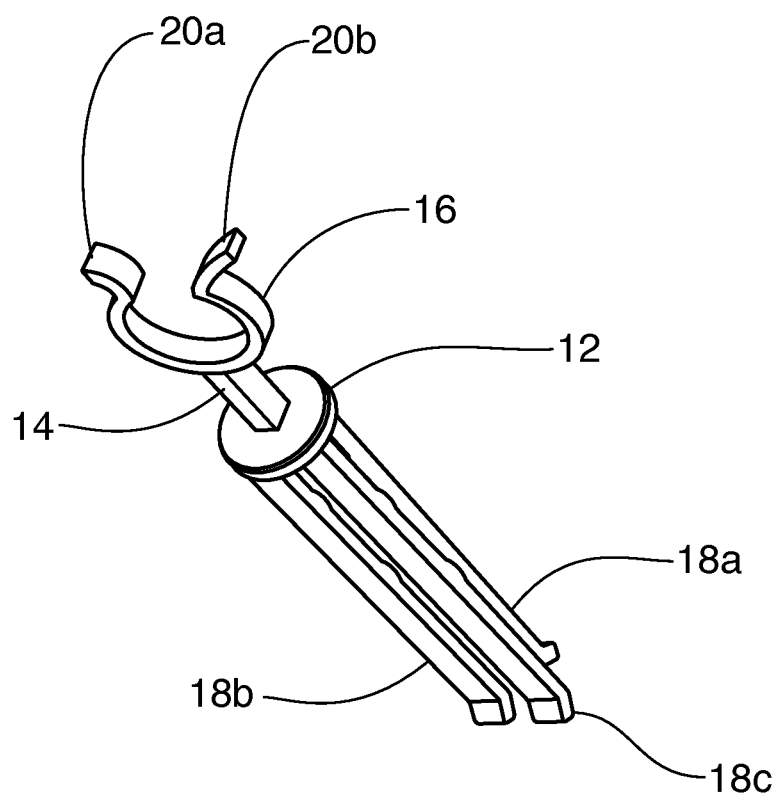

FIGS. 1-2 show a perspective view of an example clip device 10. The clip device 10 may be used to secure or retain a container, such as a lip balm container 1. In an example, the clip device 10 may be attached to a vent 2, such as the air vent on a vehicle dashboard and/or elsewhere in the vehicle. It is noted, however, that the clip device 10 is not limited to use with any particular type of container and/or attachment to a vehicle vent.

The example clip device 10 can be better seen in FIG. 2, and includes a base 12 with an arm 14 supporting an attachment 16 on one end of the base 12; and a plurality of legs 18a-c on the opposite end of the base 12.

In an example, the attachment 16 is shaped as a semi-circular, open-ended clip and is configured to receive a cylindrical container such as the lip balm container 1 (e.g., as shown in FIG. 1). The attachment 16 may also have flanged ends 20a-b to facilitate insertion and removal of the container 1. It is noted, however, that the attachment 16 is not limited to any particular attachment type. In addition, the attachment 16 may instead be connected directly to the base 12.

In an example, the plurality of legs 18a-c are configured to attach onto and/or between slats 3 of the vent 2 (e.g., as shown in FIG. 1). The legs 18a-c may be flexible and/or biased, so as to provide a gripping on and/or between the slats 3 of the vent 2. The legs 18a-c may also include flanged end portions to facilitate insertion and removal of the clip device 10 onto the vent 2. It is noted however, that the plurality of legs 18a-c are not limited to any particular number and/or configuration. For example, other configurations may be provided for attachment to other surfaces.

Before continuing, it should be noted that the examples described above are provided for purposes of illustration, and are not intended to be limiting. Other components and/or device configurations may also be utilized within the scope of the claims appended hereto.

Figure 3:
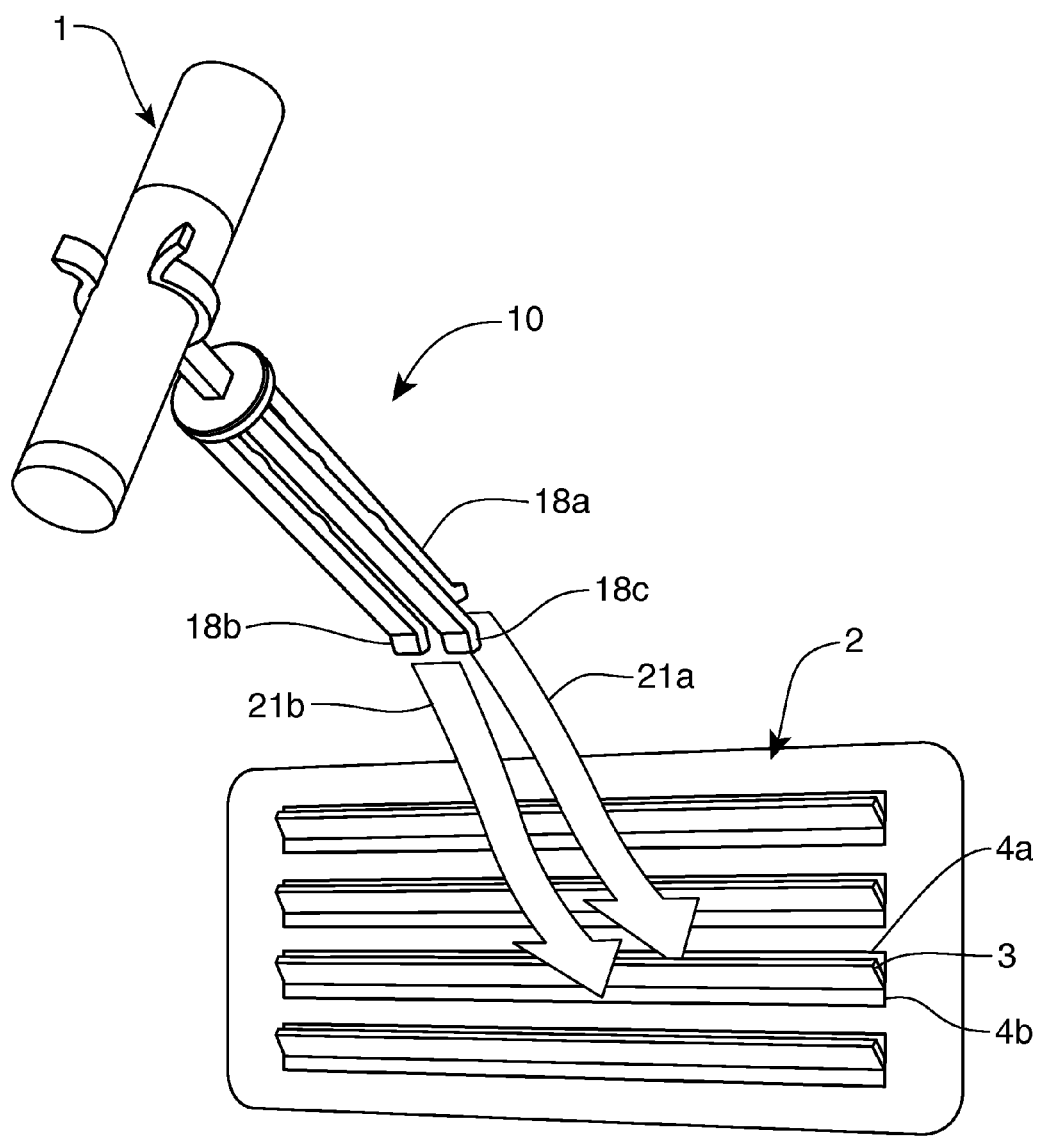
FIG. 3 is an illustration showing the example clip device including lip balm container being inserted into a vent.
Figure 4:
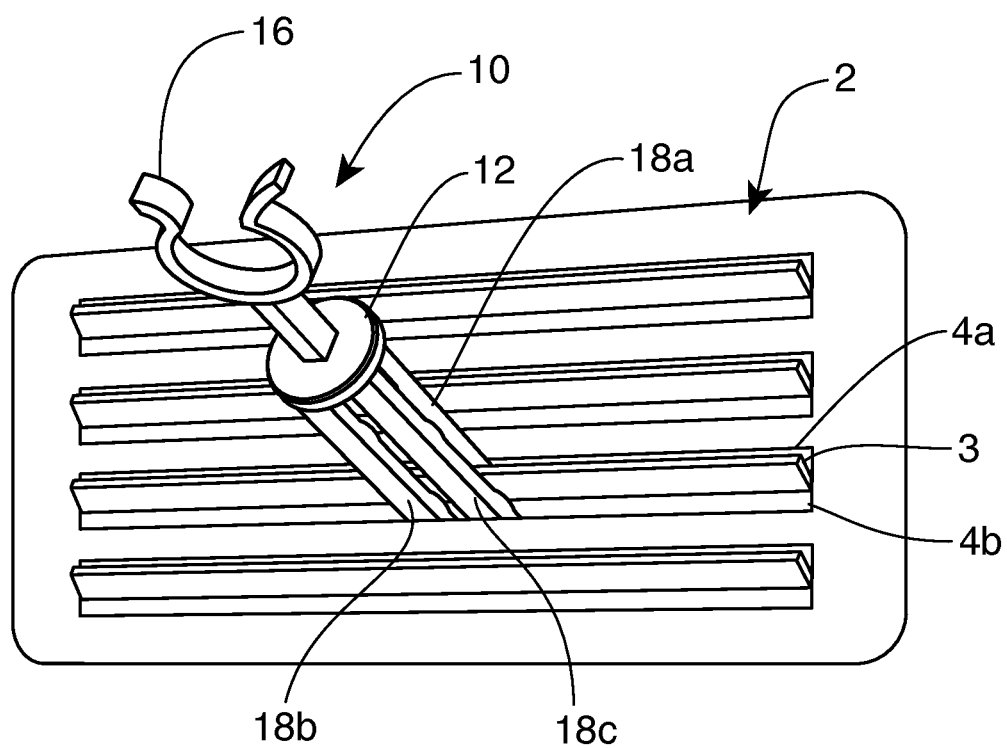
FIGS. 4-6 are illustrations showing insertion of the lip balm container in the example clip device.

FIG. 3 is a perspective illustration of the clip device 10 showing how it may be inserted over slat 3 and into the openings 4a-b of the vent 2. The arrows denote the direction the legs 18a-c may be moved to secure the clip device 10 on a slat 3. For example, the leg 18a may fit over the slat 3 and into the opening 4a, while the legs 18b-c may fit under the slat 3 and into the opening 4b, for attachment to the vent 2, e.g., as shown in FIG. 4.

Figure 5:
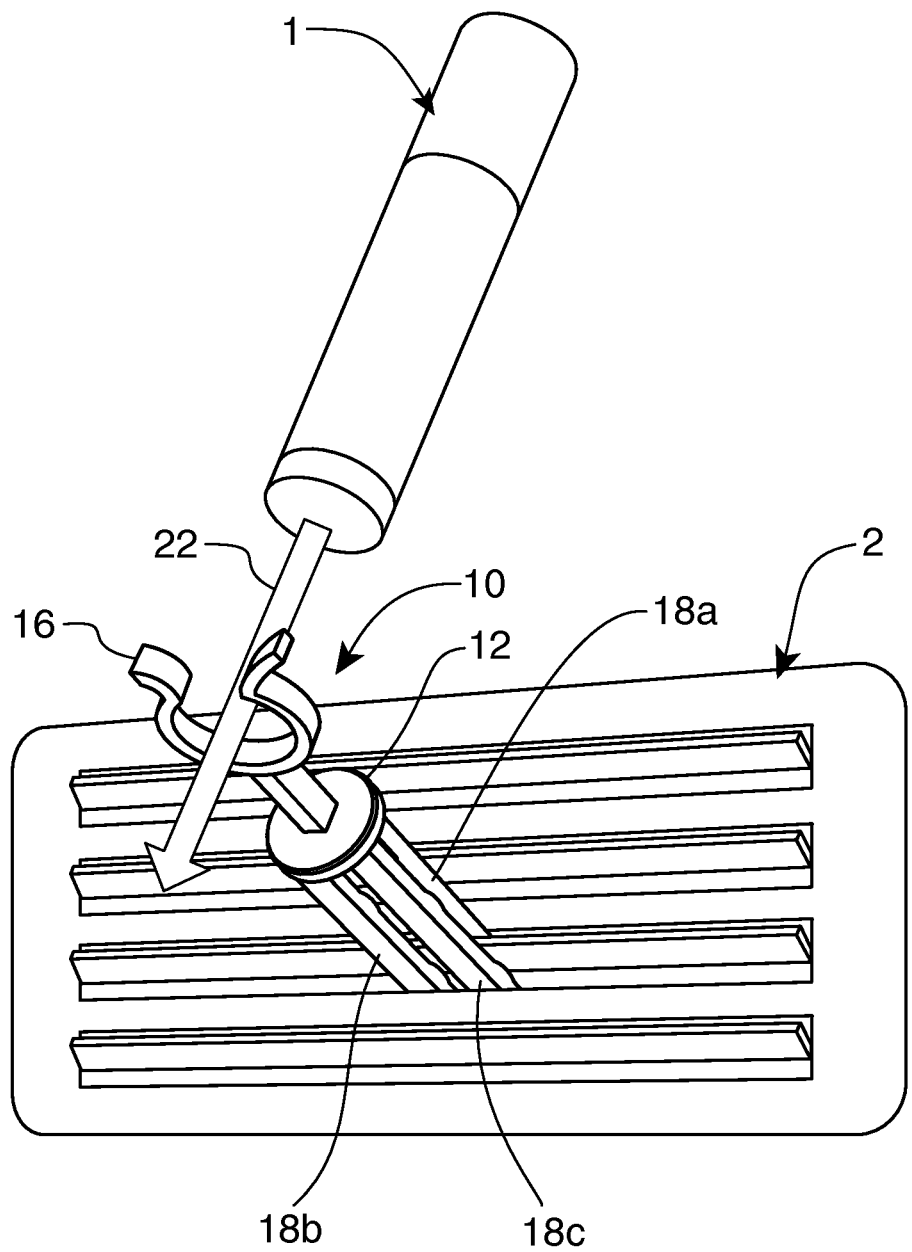
Figure 6:
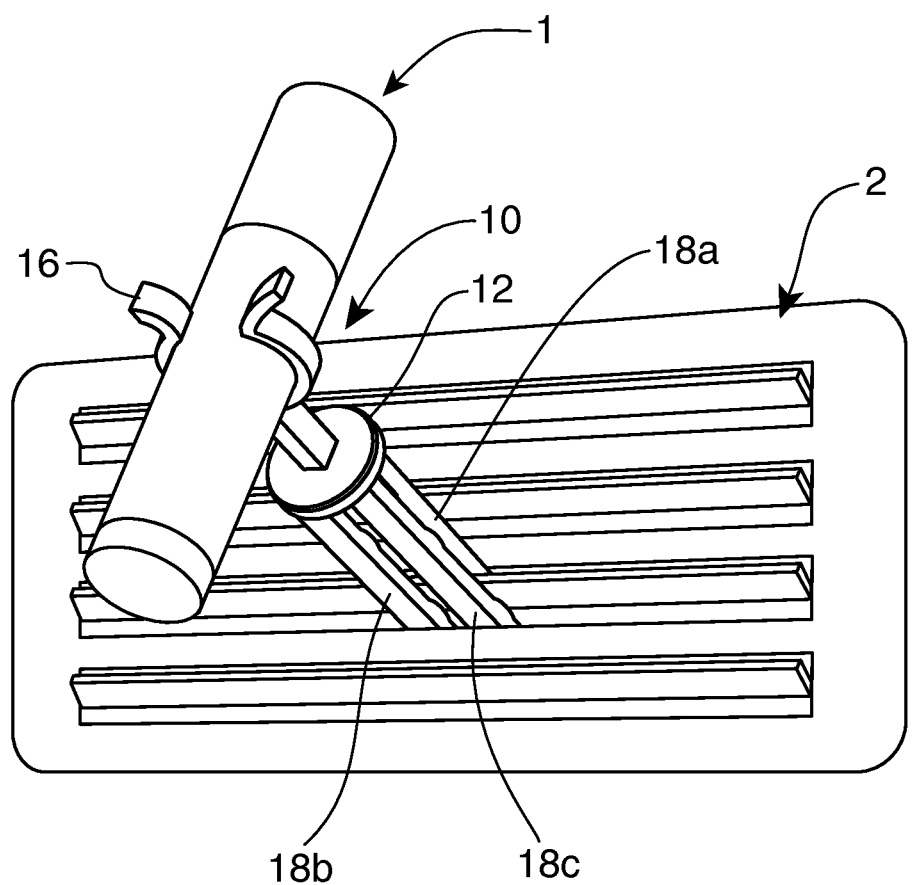

The container 1 may be inserted into the attachment 16 of the clip device 10 prior to attaching the clip device 10 to the vent 2, e.g., as illustrated in FIG. 3. Likewise, the container 1 may be inserted into the attachment 16 of the clip device 10 after attaching the clip device 10 to the vent 2, e.g., as illustrated by arrow 22 in FIG. 5 to the position shown in FIG. 6.

It is noted that the clip device 10 may be removed from the vent 2, the container 1 may be removed from the clip device 10 in a similar manner (albeit opposite direction) as explained above for inserting the clip device 10 into the vent 2. As such, the clip device 10 may be repositioned in the same vehicle (e.g., closer to the driver or passenger, or in the rear seat), and/or moved to different vehicles and/or other locations.

It is also noted that the container 1 may be removed from the clip device 10 in a similar manner (albeit opposite direction) as explained above for inserting the container 1 into the clip device 10.

Figure 7:
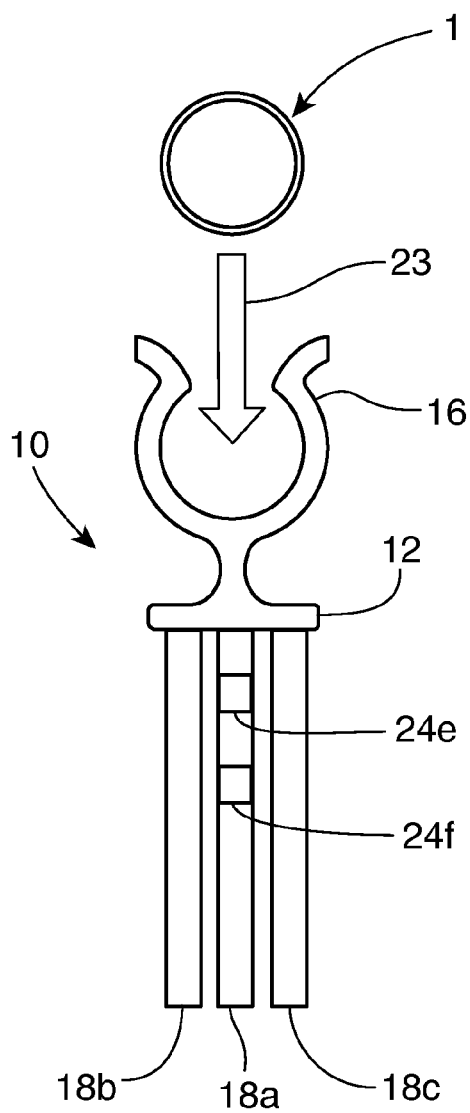
FIGS. 7-8 are side views of the clip device illustrating a lip balm container being inserted therein.
Figure 8:
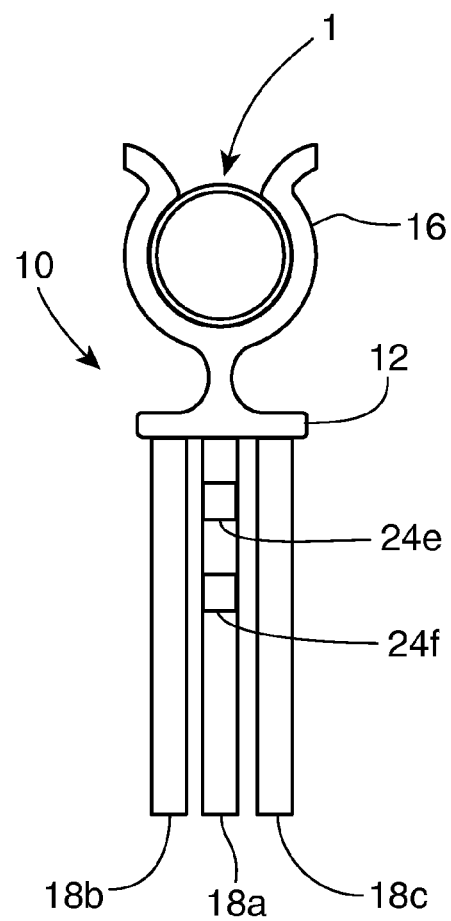

In addition, the container 1 may also be inserted into, and removed from the clip device 10 by directly pushing the container 1 into the clip device, e.g., as illustrated by arrow 23 in FIG. 7 to the position shown in FIG. 8. Again, the container 1 may be removed from the clip device 10 in a similar manner (albeit opposite direction) as shown in FIG. 7 for inserting the container 1 into the clip device 10.

In any of these examples, the attachment 16 may have an inner diameter that is smaller than the outer diameter of the container 1, such that insertion of the container 1 into the attachment 16 causes the attachment to expand and receive the container 1 therein, thus securing the container 1 such that the container 1 does not fall out of the attachment 16. However, the attachment 16 is configured to readily release the container 1, e.g., without the user having to use excessive force and/or tools.

Figure 9:
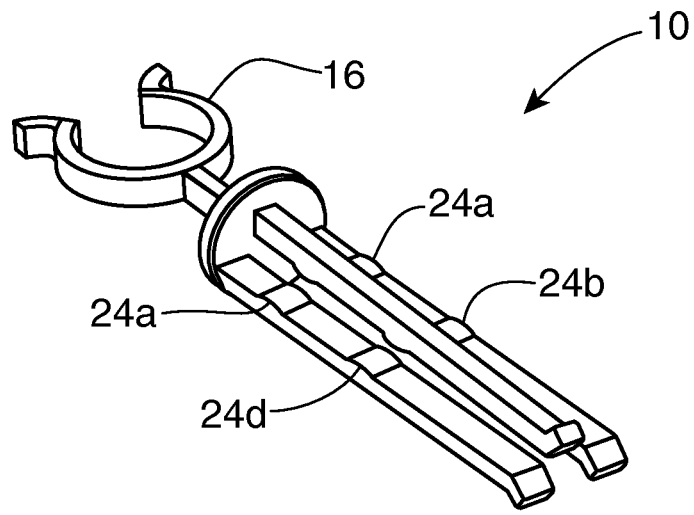
FIGS. 9-10 are further perspective views of the example clip device.
Figure 10:
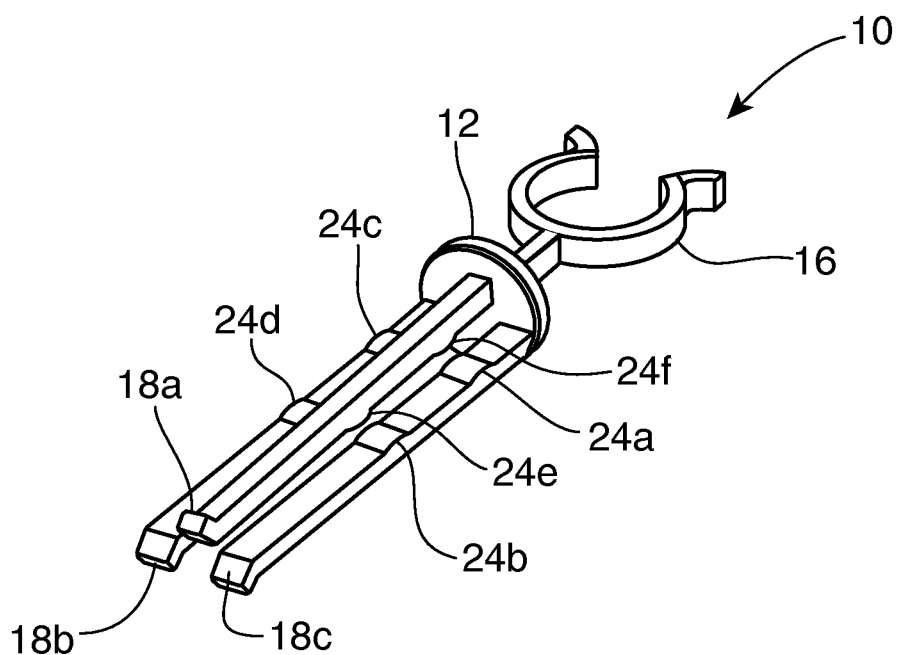

FIGS. 9-10 are further perspective views of the example clip device. Ridges 24a-d are shown at predetermined intervals (i.e., spaced from each other a predetermined distance) on the legs 18b-c. Corresponding ridges 24e-f (not seen in FIG. 9, but visible in FIG. 10) may also be provided on leg 18a. The ridges 24a-f may be provided to facilitate engagement of the legs 18a-c with the vent 2. The ridges 24a-f and legs 18a-c may be formed such that they are designed to properly engage the desired size slat 3 of the vent 2. In an example, the ridges 24a-f and legs 18a-c may be formed such that they are designed to properly engage a wide range of vehicle vent slats.

In an example use, the clip device 10 may be secured to the vent 2 (e.g., a car air handling system) or other desired receptacle. To secure the clip device 10 to the slat 3 of the vent 2, the legs 18a-c are push fitted around the slat 3 and the clip device 10 is then pressed into the vent 2 such that the ridges 24a-f engage about the slat 3 of the vent 2. When the slat 3 is between the ridges 24a-f, the clip device 10 is stable and a lip balm container 1 and/or other container can be readily inserted and removed in the attachment 16.

In another example use, the clip device may be secured to the vent 2 (e.g., a car air handling system) or other desired receptacle. To secure the clip device 10 to the vent 2, the legs 18a-c are push fitted into a single opening (e.g., opening 4a of the vent 2 shown in FIG. 3), and the clip device 10 is then pressed into the vent 2 such that the legs 18a-c expand in the opening 4a of the vent 2. In such an example, the ridges 24a-f may be instead (or in addition to) formed on the outer side of the legs 18a-c (not shown). When the legs 18a-c are fully engaged in the opening 4a, the clip device 10 is stable and a lip balm container 1 and/or other container can be readily inserted and removed in the attachment 16.

The clip device may be made of a wide variety of materials including plastics and rubbers, natural or synthetic, or metals, to name only a few non-limiting examples. The device may be of various sizes, configurations, and colors to adapt to various vent types, sizes and desires of the user.

It is noted that the examples shown and described are provided for purposes of illustration and are not intended to be limiting. Still other examples are also contemplated.

The invention claimed is:

1. A clip device to secure a container to a mounting location, comprising:
   a base having a first and second side;
   an arm connected to the first side of the base;
   an attachment connected to the arm, the attachment configured to removably receive the container; and
   a plurality of at least three legs connected to the second side of the base, the legs configured for securement to the mounting location;
   wherein at least one of the plurality of legs is configured for insertion on one side of a vent slat, and at least two of the plurality of legs are configured for insertion into a second vent opening on another side of the vent slat.

2. The clip device of claim 1, further comprising flanges on each of the plurality of legs.

3. The clip device of claim 1, further comprising a plurality of spaced-apart ridges on each of the plurality of legs, the ridges configured to removably grasp the mounting location.

4. The clip device of claim 1, wherein the attachment is a semi-circular, open-ended clip.

5. The clip device of claim 4, further comprising flanges on each open end of the open-ended clip.

6. The clip device of claim 1, wherein the diameter of the attachment expands to receive and secure the container, and the diameter returns to an initial size after removing the container.

7. The clip device of claim 1, wherein the attachment is configured to receive the container in an insertion direction perpendicular to an elongate axis of the plurality of legs and in an insertion direction parallel to the elongate axis of the plurality of legs.

8. A vent clip to secure a lip balm applicator to an automobile vent, comprising:
   a base having a first and second side;
   an arm connected to the first side of the base;
   an semi-circular attachment connected to the arm, the semi-circular attachment configured to removably receive the lip balm applicator; and
   a plurality of at least three legs connected to the second side of the base, the legs configured for securement to the automobile vent;
   wherein one of the plurality of legs is configured for insertion into a first vent opening on one side of a vent slat, and two of the plurality of legs are configured for insertion into a second vent opening on another side of the vent slat.

9. The vent clip of claim 8, wherein the plurality of legs are configured for insertion into a vent opening between adjacent vent slats.

10. The vent clip of claim 8, further comprising flanges on each of the plurality of legs.

11. The vent clip of claim 8, further comprising a plurality of spaced-apart ridges on each of the plurality of legs, the ridges configured to removably grasp a slat of the automobile vent.

12. The vent clip of claim 8, wherein the semi-circular attachment is open-ended.

13. The vent clip of claim 12, further comprising flanges on each end of the open-ended semi-circular attachment.

14. The vent clip of claim 8, wherein the diameter of the semi-circular attachment expands to receive and secure the lip balm applicator, and the diameter of the semi-circular attachment returns to an initial size after removing the lip balm applicator.

15. The vent clip of claim 8, wherein the attachment is configured to receive the lip balm applicator in an insertion direction perpendicular to an elongate axis of the plurality of legs and in an insertion direction parallel to the elongate axis of the plurality of legs.

\* \* \* \* \*